(12) United States Patent
Chen et al.

(10) Patent No.: US 10,104,306 B2
(45) Date of Patent: Oct. 16, 2018

(54) IMAGE PROCESSING METHOD APPLIED TO A DISPLAY AND ASSOCIATED CIRCUIT

(71) Applicant: MSTar Semiconductor, Inc., Hsinchu Hsien (TW)

(72) Inventors: Chung-Yi Chen, Hsinchu County (TW); Wei-Ting Huang, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 15/638,579

(22) Filed: Jun. 30, 2017

(65) Prior Publication Data

US 2018/0063404 A1 Mar. 1, 2018

Related U.S. Application Data

(60) Provisional application No. 62/379,757, filed on Aug. 26, 2016.

(51) Int. Cl.
*H04N 5/235* (2006.01)
*H04N 5/232* (2006.01)
*H04N 21/435* (2011.01)
*G06T 5/00* (2006.01)
(Continued)

(52) U.S. Cl.
CPC .......... *H04N 5/2355* (2013.01); *G06T 5/001* (2013.01); *G06T 5/009* (2013.01);
(Continued)

(58) Field of Classification Search
CPC ............. H04N 5/2355; H04N 5/23232; H04N 5/23296; H04N 2005/44539; H04N 2005/9135

USPC ....... 348/498, 497, 493, 467, 469, 488, 411, 348/426.1, 425.3, 678, 679, 673, 687, 348/663, 631, 523, 567, 558, 708, 706, 348/712, 714, 716, 719, 725, 396.1, 234,
(Continued)

(56) References Cited

U.S. PATENT DOCUMENTS

2006/0176312 A1\* 8/2006 Kuno ....................... G09G 5/14
345/589
2006/0274204 A1\* 12/2006 Kimura .................. H04N 5/208
348/558
(Continued)

FOREIGN PATENT DOCUMENTS

TW 200425003 11/2004
WO WO2016002154 1/2016

*Primary Examiner* — Michael Lee
(74) *Attorney, Agent, or Firm* — WPAT, PC

(57) ABSTRACT

A circuit applied to a playback device includes an image format determining circuit, a control circuit, an image processing module and a blending circuit. The image format determining circuit receives an image signal and determines whether the format of the image signal is a standard dynamic range (SDR) or a high dynamic range (HDR) to generate a determination result. The control circuit generates a control signal according to the determination result. The image processing module selects an image processing setting corresponding to one of the SDR format and the HDR format, and processes the image signal according to the image processing setting to generate a processed image signal. The blending circuit superimposes an interface image onto the processed image signal to generate an output image signal to a display.

11 Claims, 7 Drawing Sheets

(51) Int. Cl.
*H04N 5/445* (2011.01)
*H04N 5/913* (2006.01)

(52) U.S. Cl.
CPC ..... *H04N 5/23232* (2013.01); *H04N 5/23296* (2013.01); *H04N 21/4356* (2013.01); *H04N 2005/44539* (2013.01); *H04N 2005/9135* (2013.01)

(58) Field of Classification Search
USPC ..... 348/235, 236, 238, 32, 34; 345/1.1, 214, 345/426, 440, 549, 581, 589, 590, 690; 382/107, 154, 162, 166, 167, 169, 168
See application file for complete search history.

(56) References Cited

U.S. PATENT DOCUMENTS

| | | | | |
|---|---|---|---|---|
| 2011/0188744 A1* | 8/2011 | Sun | .......................... | G06T 5/50 382/162 |
| 2013/0148029 A1* | 6/2013 | Gish | ........................ | G09G 5/02 348/708 |
| 2013/0148907 A1* | 6/2013 | Su | ........................... | G06T 9/004 382/238 |
| 2014/0002479 A1* | 1/2014 | Muijs | ........................ | G06T 5/50 345/589 |
| 2014/0029675 A1* | 1/2014 | Su | ........................ | H04N 19/105 375/240.16 |
| 2014/0210847 A1* | 7/2014 | Knibbeler | .............. | G09G 5/006 345/589 |
| 2014/0363093 A1* | 12/2014 | Miller | ........................ | G06F 3/14 382/235 |
| 2015/0103919 A1* | 4/2015 | Hattori | ................ | H04N 19/124 375/240.25 |
| 2016/0205338 A1* | 7/2016 | Kozuka | .................... | H04N 5/20 348/687 |
| 2016/0343348 A1* | 11/2016 | Oh | .......................... | G09G 5/10 |
| 2017/0061894 A1* | 3/2017 | Ikeda | .................... | G09G 5/003 |
| 2017/0085827 A1* | 3/2017 | Terada | .................... | G09G 5/10 |
| 2017/0104973 A1* | 4/2017 | Toma | .................. | H04N 9/8715 |

* cited by examiner

IMAGE PROCESSING METHOD APPLIED TO A DISPLAY AND ASSOCIATED CIRCUIT

This application claims the benefit of U.S. Provisional Application Ser. No. 62/379,757, filed Aug. 26, 2016, the subject matter of which is incorporated herein by reference.

BACKGROUND OF THE INVENTION

Field of the Invention

The invention relates in general to image processing, and more particularly to an image processing method for an image signal in a high dynamic range (HDR) format and an associated circuit.

Description of the Related Art

In an operation of a convention television, when a user turns on an on-screen display (OSD), an image processing circuit in the television superimposes the OSD onto an image currently to be displayed to generate a superimposed image. Image processes including noise cancellation, color space conversion and color adjustment are performed on the superimposed image to generate an output image, which is then displayed on a screen. However, the OSD usually adopts a standard dynamic range (SDR) format, while some image signals adopt a high dynamic range (HDR) range to provide display images with pictures of higher contrast and better clarity in the recent years. Consequently, an issue is caused—an image processing circuit needs to perform different image processes on images encoded by HDR and images encoded by SDR. Thus, if the OSD encoded by SDR is superimposed onto an image encoded by HDR and image processing is then performed, the OSD inevitably flickers during a display process, causing user inconveniences.

SUMMARY OF THE INVENTION

It is an object of the present invention to provide an image processing method for an image signal having a high dynamic range (HDR) format and an associated circuit. The method and circuit of the present invention superimpose an on-screen display (OSD) onto an image currently to be displayed after image processing is completed to prevent the issue of image flickering of the prior art.

According to an embodiment of the present invention, a circuit applied to a playback device includes an image format determining circuit, a control circuit, an image processing module and a blending circuit. The image format determining circuit receives an image signal, and determines whether a format of the image signal is a standard dynamic range (SDR) or a high dynamic range (HDR) to generate a determination result. The control circuit generates a control signal according to the determination result. The image processing module selects an image processing setting corresponding to one of the SDR format and the HDR format according to the control signal, and processes the image signal according to the image processing setting to generate a processed image signal. The blending circuit superimposes an interface image onto the processed image signal to generate an output image signal to a display.

According to another embodiment of the present invention, an image processing method applied to a playback device includes: receiving an image signal, and determining whether a format of the image signal is an SDR or an HDR to generate a determination result; generating a control signal according to the determination result; selecting an image processing setting corresponding to one of the SDR format and the HDR format according to the control signal, and processing the image signal according to the image processing setting to generate a processed image signal; and superimposing an image interface onto the processed image signal to generate an output signal to a display.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
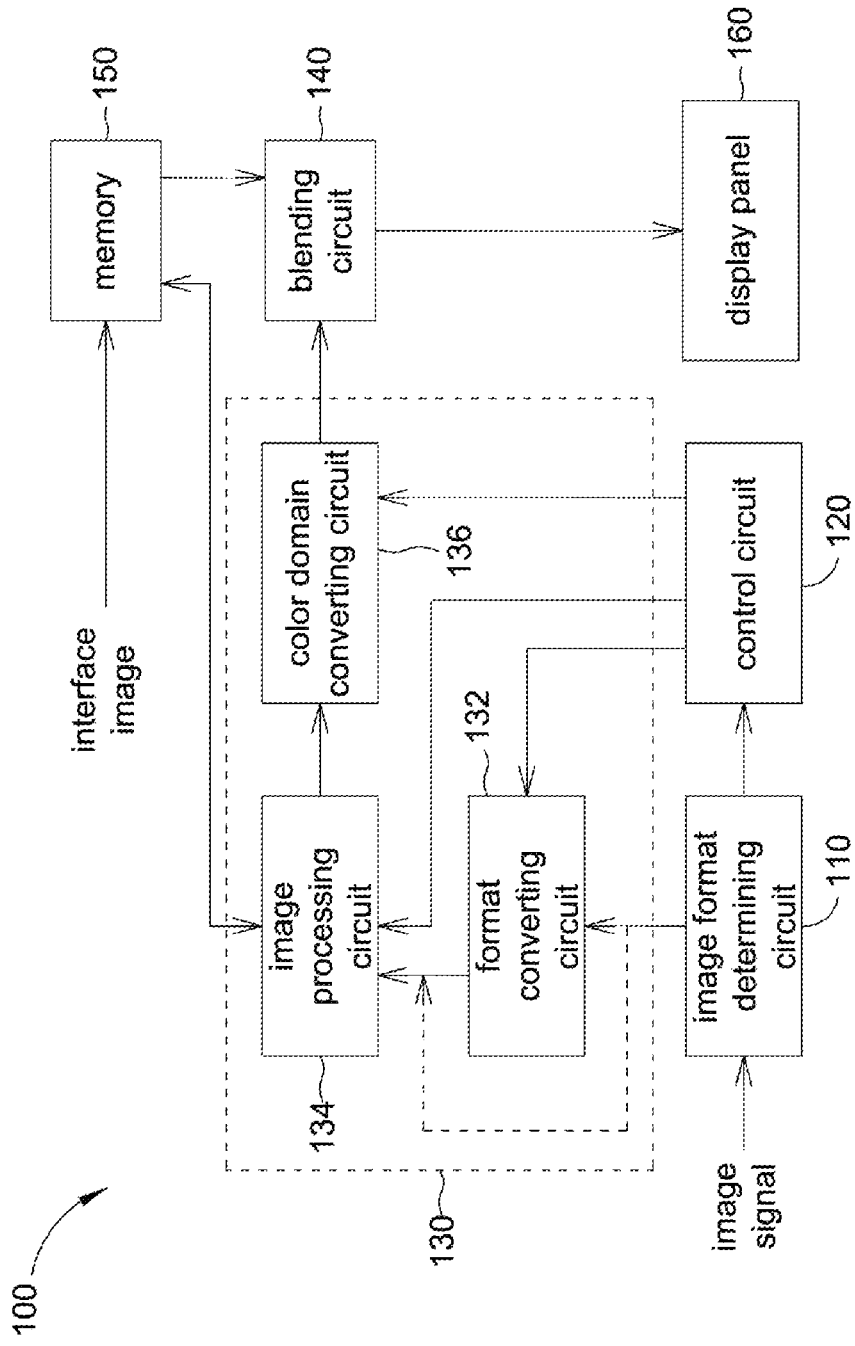
FIG. 1 is a block diagram of a television according to an embodiment of the present invention.

FIG. 1 shows a block diagram of a playback device according to an embodiment of the present invention. In this embodiment, the playback device is a television 100. As shown in FIG. 10, the television 100 includes an image format determining circuit 110, a control circuit 120, an image processing module 130, a blending circuit 140, a memory 150 and a display panel 160. The image processing module 130 includes a format converting circuit 132, an image processing circuit 134 and a color space converting circuit 136. In this embodiment, the television 100 may receive and display high dynamic range (HDR) and standard dynamic range (SDR) images. The image format determining circuit 110, the control circuit 120, the image processing module 130 and the blending circuit 140 are fabricated in a system chip.

In the television 100, the image format determining circuit 110 receives an image signal, and determines whether a format of the image signal is SDR or HDR to generate a determination result. More specifically, the image format determining circuit 110 may determine whether the format of the image signal is HDR according to contents of a stream header or an information frame of the image signal, e.g., whether information of ST.2086 specified by the Society of Motion Picture & Television Engineers (SMPTE) is included, or the format of the image signal is SDR that satisfies specifications of common televisions.

The control circuit 120 generates a control signal according to the determination result that the image format determining circuit 110 generates to control settings of the circuits in the image processing module 130. More specifically, when the determination result indicates that the format of the image signal is HDR, the control circuit 120 generates the control signal to the image processing module 130 to control the format converting circuit 132, the image processing circuit 134 and the color space circuit 136 to process the image signal according to an image processing setting satisfying the HDR. When the determination result indicates that the format of the image signal is SDR, the control circuit 120 generates the control signal to the image processing module 130 to control the format converting circuit 132, the image processing circuit 134 and the color space circuit 136 to process the image signal according to another image processing setting satisfying the SDR.

In one embodiment, the control circuit 120 generates the control signal according to whether the display panel 160 supports the HDR. In the embodiment and the description below, it is assumed that the display panel 160 supports only the SDR display type, and the format of the interface image is also the SDR.

In an operation of the image processing module 130, when the determination result indicates that the format of the image signal is the HDR, the format converting circuit 132 converts the format of the image signal from the HDR to the SDR to generate a converted image signal. On the other hand, when the determination result indicates that the format of the image signal is the SDR, the format converting circuit 132 directly outputs the image signal to the image processing circuit 134, i.e., the format converting circuit 132 does not perform any format conversion on the image signal; alternatively, the control circuit 120 controls the image signal to be directly outputted to the image processing circuit 132 without going through the format converting circuit 132 (as represented by the dotted arrow).

Figure 2:
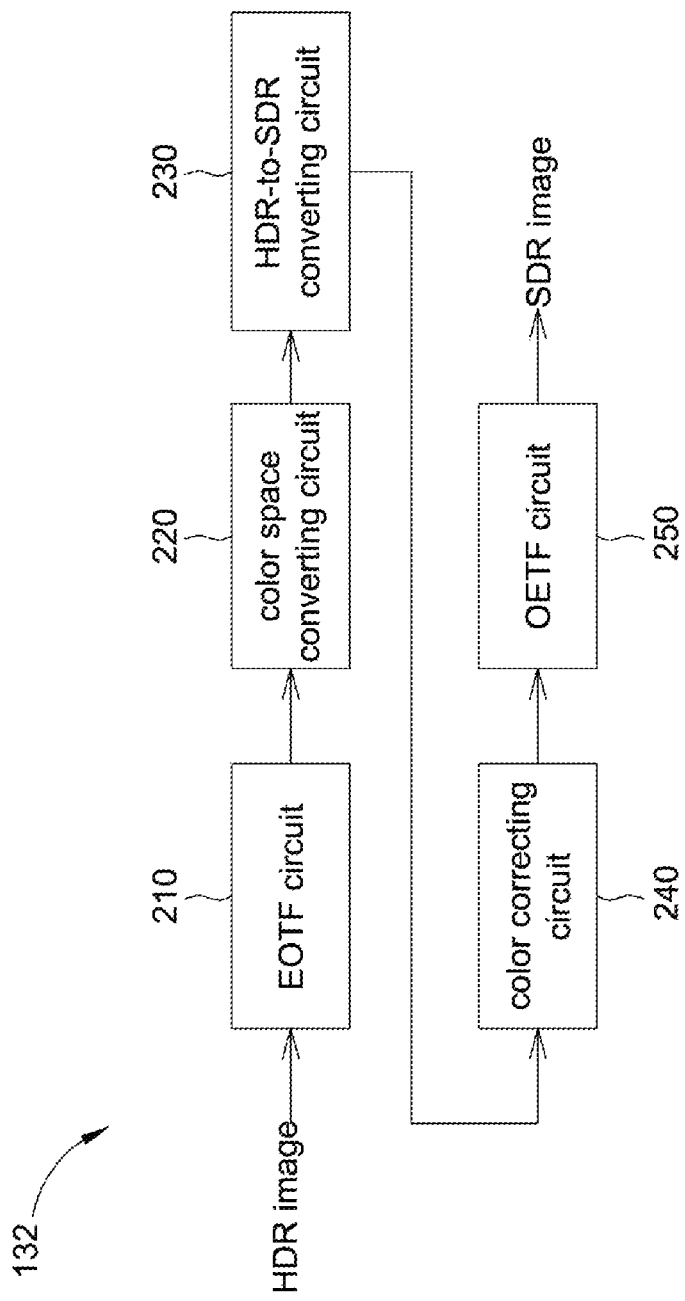
FIG. 2 is a block diagram of a format converting circuit in FIG. 1 according to an embodiment of the present invention.

Referring to FIG. 2, the format converting circuit 132 according to another embodiment of the present invention includes an electro-optical transfer function (EOTF) circuit 210, a color space converting circuit 220, an HDR-to-SDR converting circuit 230, a color correcting circuit 240 and an optical-electro transfer function (OEFT) circuit 250. More specifically, the EOTF circuit 210 converts the HDR image signal to an optic signal according to the ST.2084 specified by the SMPTE or the BT.2100 specified by the International Communication Union (ITU). The color space converting circuit 220 performs color space conversion on the optic signal according to the BT.2020 or DCI-P3 specified by the ITU and a target color space to generate a color converted optic signal. The HDR-to-SDR converting circuit 230 converts the HDR color converted optic signal to a format converted optic signal having the SDR. For example, the color converted optic signal has a range of 0 to 10000 nit, and the format converted optic signal has a range of 0 to 500 nit. The color correcting circuit 240 adjusts color and saturation parameters of the format converted optic signal to generate a color adjusted optic signal. The OETF circuit 250 converts the color adjusted optic signal to an electronic signal. If the display panel 160 is a type supporting the SDR, the OETF circuit 250 may set to have a gamma value "2.2".

Figure 3:
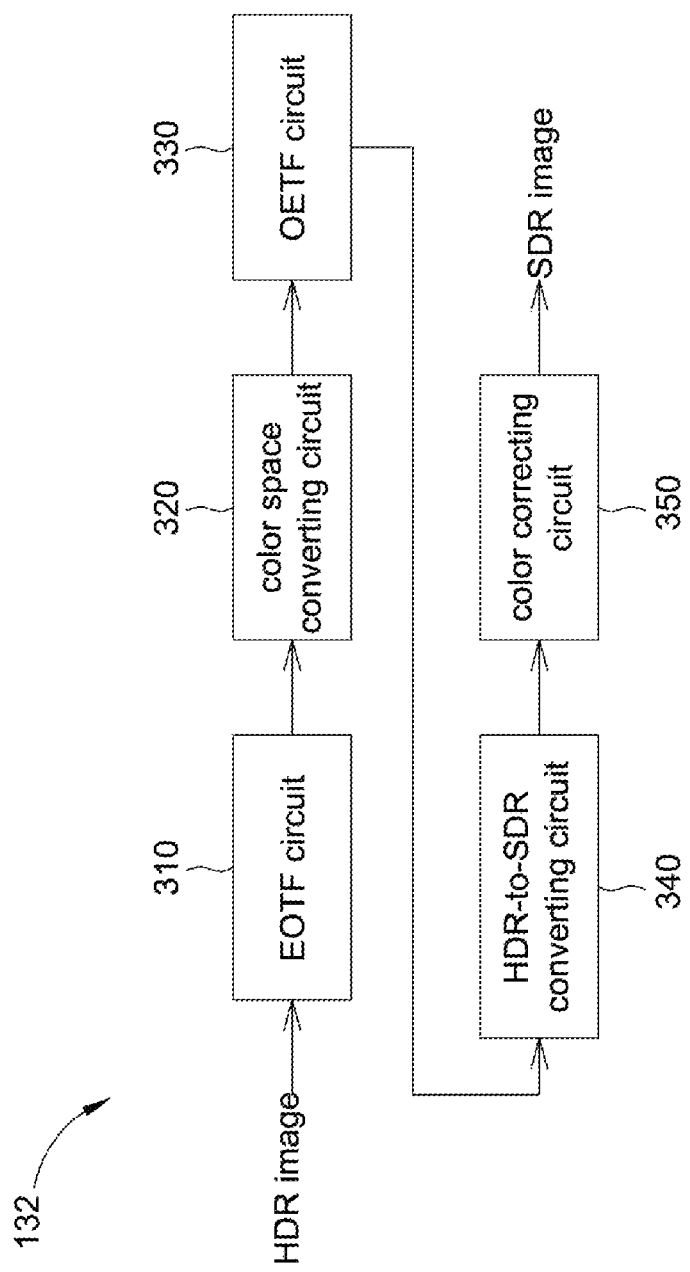
FIG. 3 is a block diagram of a format converting circuit according to another embodiment of the present invention.

Referring to FIG. 3, the format converting circuit 132 in another embodiment of the present includes an EOTF circuit 310, a color space converting circuit 320, an OETF circuit 330, an HDR-to-SDR converting circuit 340 and the color correcting circuit 350. The EOTF circuit 310, the color space converting circuit 320, the OETF circuit 330, the HDR-to-SDR converting circuit 340 and the color correcting circuit 350 are similar to the EOTF circuit 210, the color space converting circuit 220, the OETF circuit 250, the HDR-to-SDR converting circuit 230 and the color correcting circuit 240, and associated details shall be omitted. However, the conversion from the HDR to the SDR is performed in a condition of electronic signals, and therefore a smaller data size and lower hardware costs are rendered compared to the embodiment in FIG. 2.

The image processing circuit 134 processes the converted image signal (the image signal converted from the HDR format to the SDR format) or the image signal (the image signal originally in the SDR format) to generate an intermediate signal. Although the image processing circuit 134 processes the image signal in the SDR format, it processes the image signal originally in the SDR format and the converted image signal in the SDR format according to different image processing settings. More specifically, the image processing circuit 134 may perform image processes such as noise cancellation, image scaling, resolution enhancement, contrast adjustment and color adjustment (including color and saturation adjustment) to generate the intermediate signal. In one embodiment, for the converted signal converted from the HDR to the SDR, the image processing circuit 134 adopts deeper saturation adjustment to provide more vivid and brighter colors, and/or adopts stronger contrast adjustment to enhance image details. For the image signal originally in the SDR format, the image processing circuit 134 adopts weaker saturation adjustment and/or common contrast adjustment. Further, the image processing circuit 134 is further coupled to the memory 150. Thus, the image processing circuit 134 is allowed to store image data, e.g., data of a previous frame, to the memory 150 for image processing (e.g., noise cancellation) of subsequent frames.

The color space converting circuit 136 performs color space conversion on the intermediate signal according to color display capabilities of the display panel 160 to generate a processed image signal. Similar to the image processing circuit 134, the color space converting circuit 136 performs the conversion on the image signal originally in the SDR format and the converted image signal in the SDR format according to different image conversion settings.

The blending circuit 140 reads the interface image from the memory 150, and superimposes the interface image onto the processed image signal outputted from the color space converting circuit 136 to generate an output image signal, which is then outputted to the display panel 160 for display. In this embodiment, for example, the interface image may be image contents related to a menu, subtitles, a user interface or an OSD.

In the embodiment above, because the blending circuit 140 locates subsequent to the image processing circuit 130, even when the image signal is in the HDR format, the image processing module 130 first converts the HDR image signal to the SDR format and forwards the SDR image signal to the blending circuit 140 for the superimposing process with the interface image (in the SDR format). Therefore, the issue of interface image flickering of the prior art is eliminated.

Figure 4:
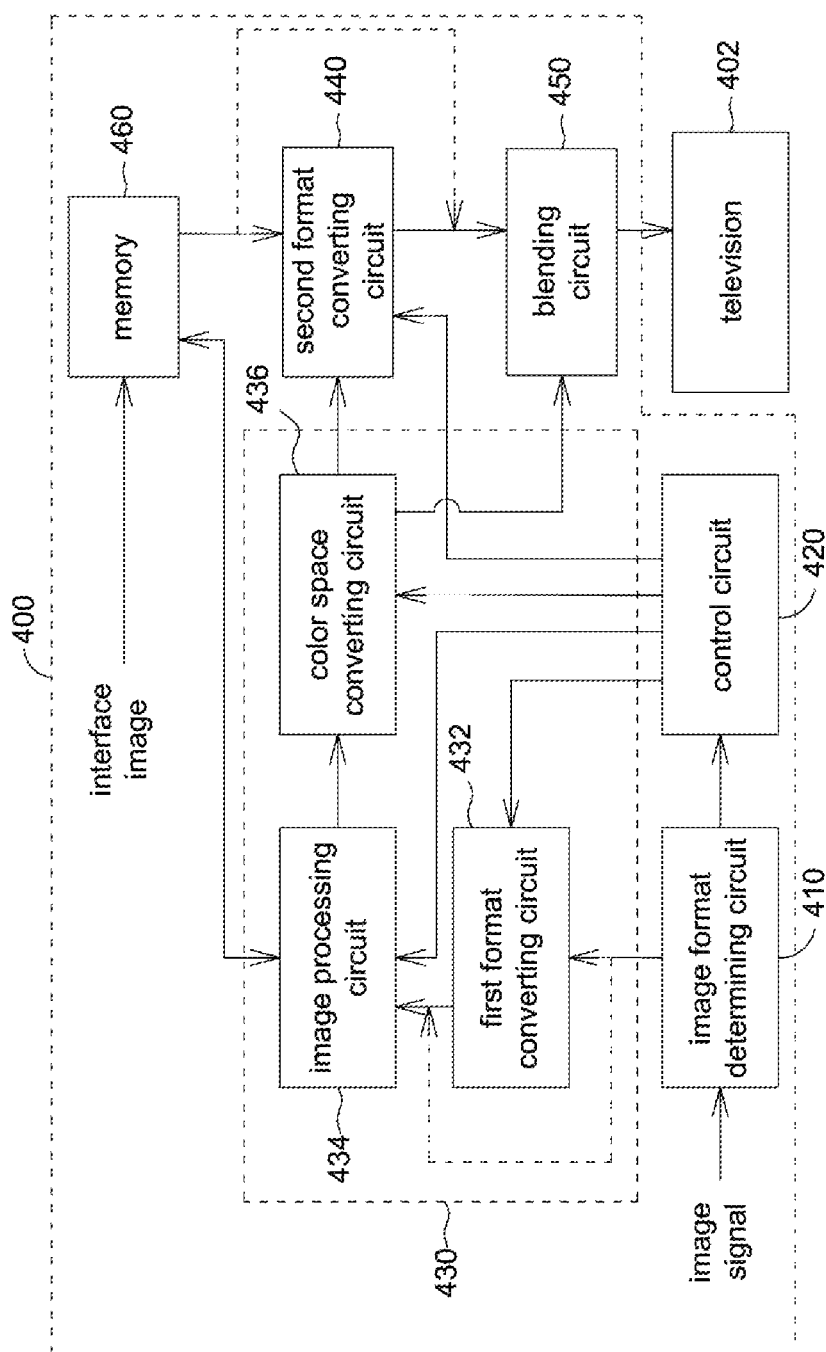
FIG. 4 is a block diagram of a set-top box (STB) according to an embodiment of the present invention.

FIG. 4 shows a block diagram of a playback device according to an embodiment of the present invention. In this embodiment, the playback device is a set-top box (STB) 400. As shown in FIG. 4, the STB 400 includes an image format determining circuit 410, a control circuit 420, an image processing module 430, a second format converting circuit 440, a blending circuit 450 and a memory 460. The STB 400 is connected to a television 402. The image processing module 430 includes a first formatting converting circuit 432, an image processing circuit 434 and a color space converting circuit 436. In this embodiment, the STB 400 receives HDR and SDR image signals and transmits these signals to the television 402 for display. The image format determining circuit 410, the control circuit 420, the image processing module 430, the second format converting circuit 440 and the blending circuit 450 are manufactured in a system chip.

In the STB 400, the image format determining circuit 410 and the image processing module 430 (including the first format converting circuit 432, the image processing circuit 434 and the color space converting circuit 436) are similar to the image format determining circuit 110 and the image processing module 130 (including the format converting circuit 132, the image processing circuit 134 and the color space converting circuit 136), and associated details shall be omitted.

The control circuit 420 generates a control signal according to a determination result generated by the image format determining circuit 410 to control settings of the circuits in the image processing module 430 and the second format converting circuit 440. More specifically, when the determination result indicates that the format of the image signal is the HDR, the control circuit 420 generates the control signal to the image processing module 430 to control the first format converting circuit 432, the image processing circuit 434 and the color space converting circuit 436 to use an image processing settings satisfying the HDR to process the image signal. When the determination result indicates that the format of the image signal is the SDR, the control circuit 420 generates the control signal to the image processing module 430 to control the first format converting circuit 432, the image processing circuit 434 and the color space converting circuit 436 to use another image processing setting satisfying the SDR to process the image signal.

In another embodiment, the control circuit 420 receives information from the television 402 to determine whether the television 402 supports the HDR format to accordingly generate the control signal. In this embodiment and the description below, the format of an interface image is the SDR.

When the control circuit 420 determines that the television 402 supports the SDR format, similar to the image processing circuit 132, the first format converting circuit 432 converts the image signal to the converted image signal in the SDR format when the image signal is in the HDR format, or directly outputs the image signal when the image signal is in the SDR format. The converted image signal in the SDR format or the image signal originally in the SDR format is processed by the image processing circuit 434 and the color space converting circuit 436 to generate a processed image signal to the blending circuit 450. Operation details of the image processing circuit 434 and the color space converting circuit 436 are similar to those of the image processing circuit 134 and the color space converting circuit 136 in FIG. 1, and shall be omitted. Further, the control circuit 420 controls the second format converting circuit 440 to directly output the interface image read from the memory 460 to the blending circuit 450, i.e., no format conversion is performed on the interface image. Alternatively, the control circuit 420 controls the blending circuit 450 to directly read the interface image stored in the memory 460 without going through the second format converting circuit 440 (represented by the dotted arrow).

When the control circuit 420 determines that the television 402 supports the HDR format, similar to the image processing circuit 132, the first format converting circuit 432 converts the image signal to the converted image signal in the SDR format when the image signal is in the HDR format, or directly outputs the image signal when the image signal is in the SDR format. The converted image signal in the SDR format or the image signal originally in the SDR format is processed by the image processing circuit 434 and the color space converting circuit 436 to generate a processed image signal to the second format converting circuit 440. Operation details of the image processing circuit 434 and the color space converting circuit 436 are similar to those of the image processing circuit 134 and the color space converting circuit 136 in FIG. 1, and shall be omitted. Further, the control circuit 420 controls the second format converting circuit 440 to convert the processed image signal and the format of the interface image read from the memory 460 from the SDR to the HDR, and sends them to the blending circuit 450.

Figure 5:
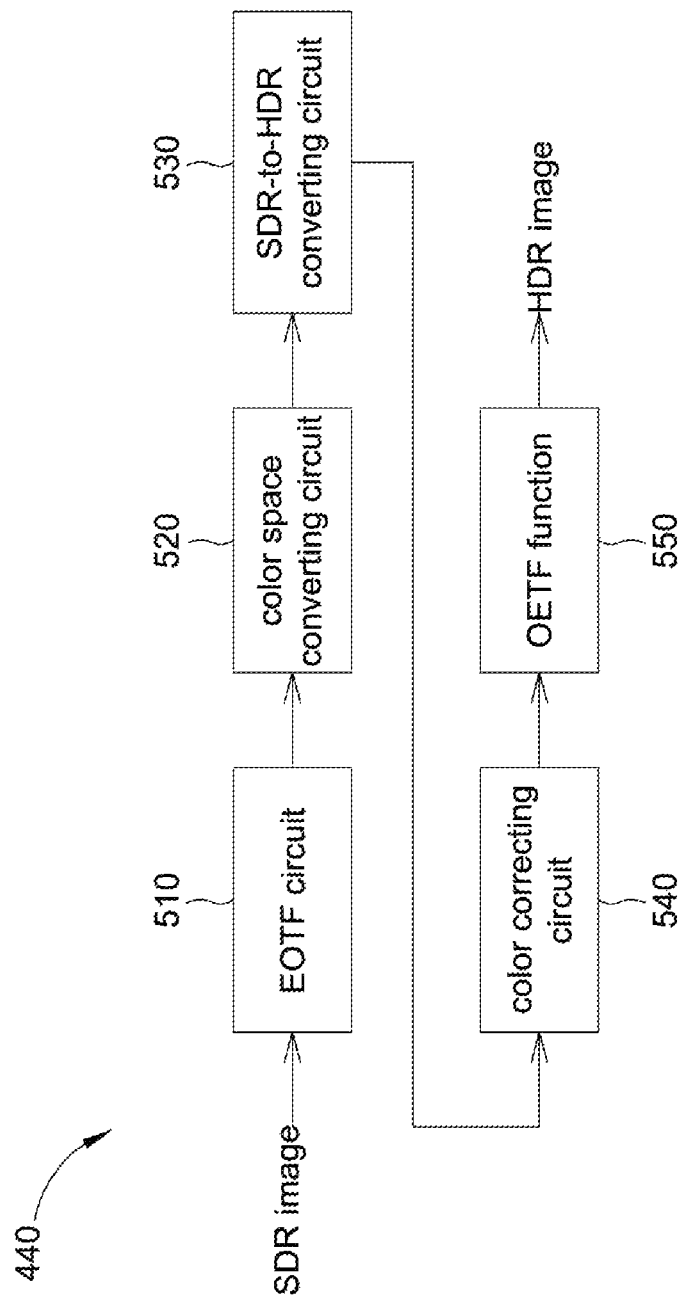
FIG. 5 is a block diagram of a second format converting circuit in FIG. 4 according to an embodiment of the present invention.

Referring to FIG. 5, the second format converting circuit 440 in one embodiment includes an EOTF circuit 510, a color space converting circuit 520, an SDR-to-HDR converting circuit 530, a color correcting circuit 540 and an OETF circuit 550. More specifically, the EOTF circuit 510 converts the SDR interface image to an optic signal. The color space converting circuit 520 performs color space conversion on the optic signal according to a target color space to generate a color converted optic signal. The SDR-to-HDR converting circuit 530 converts the color converted optic signal to a format converted optic signal having the HDR. The color correcting circuit 540 adjusts the color or saturation parameters of the format converted optic signal to generate a color adjusted optic signal. The OETF circuit 550 converts the color adjusted optic signal to an electronic signal.

Figure 6:
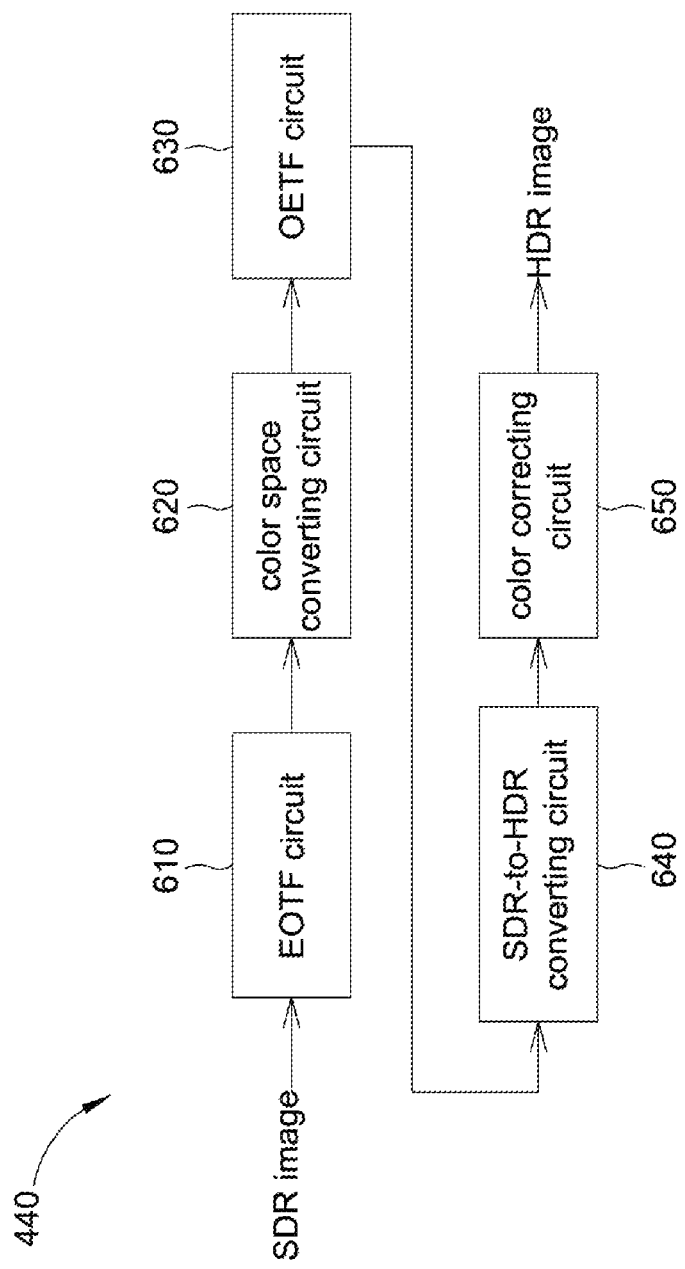
FIG. 6 is a block diagram of a second format converting circuit in FIG. 4 according to another embodiment of the present invention.

Referring to FIG. 6, the second format converting circuit 440 in another embodiment includes an EOTF circuit 610, a color space converting circuit 620, an OETF circuit 630, an SDR-to-HDR converting circuit 640 and a color correcting circuit 650. The EOTF circuit 610, the color space converting circuit 620, the OETF circuit 630, the SDR-to-HDR converting circuit 640 and the color correcting circuit 650 are respectively similar to the EOTF circuit 510, the color space converting circuit 520, the OETF circuit 550, the SDR-to-HDR converting circuit 530 and the color correcting circuit 540, and associated details shall be omitted. However, because the conversion from the SDR to the HDR is performed in a condition of electronic signals, a smaller data size and lower hardware costs are rendered compared to the embodiment in FIG. 5.

The blending circuit 450 superimposes the interface image or the format converted interface image (in the HDR format) onto the processed image signal (in the HDR format) to generate an output image signal that is then outputted to the television 402 for display.

In the above embodiments, the image processing circuits 134 and 434 and the color space converting circuit 136 and 436 are targeted at processing data in the SDR format (regardless of whether the original image signal is in the SDR format or the HDR format). However, in another embodiment, the image processing circuit 434 and the color space converting circuit 436 may also be designed to process data in the HDR format. At this point, the first format converting circuit 432 needs to be implemented according to the structure in FIG. 5 or FIG. 6. Corresponding modifications of the second format circuit 440 may be understood by one person having ordinary skill in the art, and shall be omitted herein.

Figure 7:
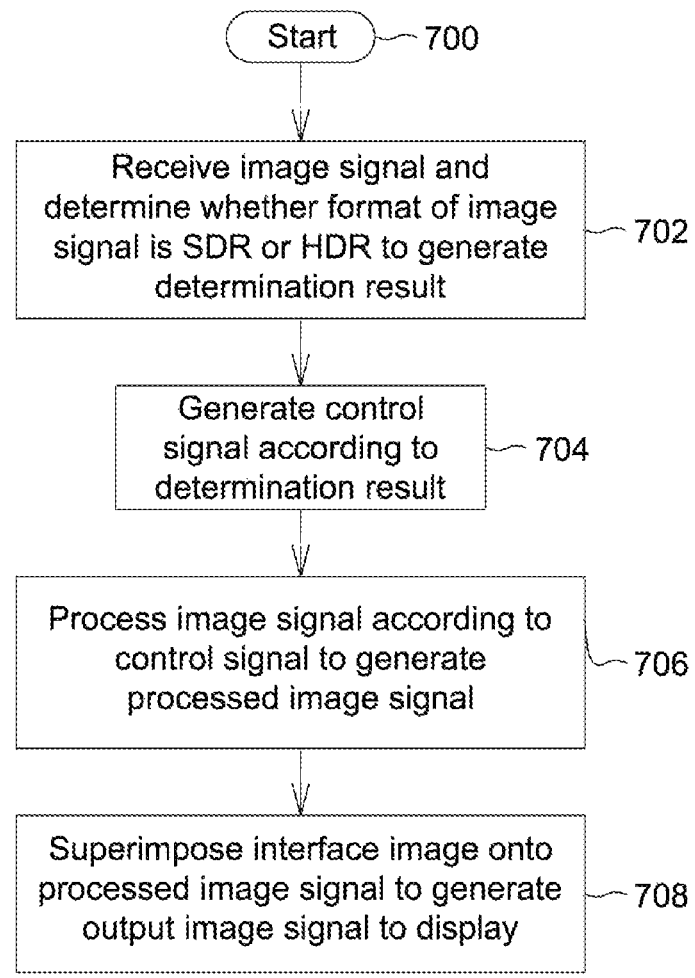
FIG. 7 is a flowchart of an image processing method applied to a display according to an embodiment of the present invention.

FIG. 7 shows a flowchart of an image processing method applied to a display according to an embodiment of the present invention. Referring to FIG. 7, the process of the method includes following steps.

In step 700, the process begins.

In step 702, an image signal is received, and whether a format of the image signal is an HDR or an SDR is determined to generate a determination result.

In step 704, a control signal is generated according to the determination result.

In step 706, the image signal is processed according to the control signal to generate a processed image signal.

In step 708, an interface image is superimposed onto the processed image signal to generate an output image signal that is then outputted to the display.

In conclusion, in the image processing method and circuit of the present invention, the interface image is superimposed onto an image currently to be displayed only after image processing is completed, thereby eliminating the issue of interface image flickering of the prior art. Further, the image processing method and circuit of the present invention are applicable to a television or an STB.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A circuit, applied to a playback device, comprising:
an image format determining circuit, receiving an image signal, determining whether a format of the image signal is a standard dynamic range (SDR) or a high dynamic range (HDR) to generate a determination result;
a control circuit, coupled to the image format determining circuit, generating a control signal according to the determination result;
an image processing module, coupled to the image format determining circuit and the control circuit, selecting an image processing setting corresponding to one of the SDR format and the HDR format according to the control signal, and processing the image signal according to the image processing setting to generate a processed image signal, said image processing module comprising:
a format converting circuit, determining whether to perform format conversion on the image signal to generate a converted image signal according to the control signal, or directly outputting the image signal without performing format conversion on the image signal;
an image processing circuit, coupled to the first format converting circuit, processing the converted image signal or the image signal according to the image processing setting to generate an intermediate signal; and
a color space converting circuit, coupled to the image processing circuit, performing color space conversion on the intermediate signal according to the image processing setting to generate the processed image signal; and
a blending circuit, coupled to the image processing module, superimposing an interface image onto the processed image signal to generate an output image signal to a display;

wherein said format converting circuit comprises:
an electro-optical transfer function (EOTF) circuit, converting the image signal having the HDR to an optic signal;
a color space converting circuit, performing color space conversion on the optic signal according to a target color space to generate a color converted optic signal;
an HDR-to-SDR converting circuit, converting the color converted optic signal to a format converted optic signal having the SDR;
a color correcting circuit, adjusting a color of the format converted optic signal to generate a color adjusted optic signal; and
an optical-electro transfer function (OETF) circuit, converting the color adjusted optic signal to the converted image signal.

2. The circuit according to claim 1, wherein when the determination result indicates that the format of the image signal is the HDR, the format converting signal converts the format of the image signal from the HDR to the SDR to generate the converted image signal.

3. The circuit according to claim 1, wherein when the determination result indicates that the format of the image signal is the SDR, the format converting circuit outputs the image signal that is not format converted to the image processing circuit.

4. The circuit according to claim 1, wherein the format converting circuit is a first format converting circuit, the circuit further comprising:
a second format converting circuit, coupled to the control circuit and the blending circuit, selectively performing format conversion on the interface image according to the control signal to generate a format converted interface image, or directly outputting the interface image to the blending circuit without performing format conversion on the interface image;
wherein, the blending circuit superimposes the interface image or the format converted interface image onto the processed image signal to generate the output image signal.

5. The circuit according to claim 4, wherein when the display supports the HDR format, the second format converting circuit converts the format of the interface image from the SDR format to the HDR format according to the control signal to generate the format converted interface image.

6. The circuit according to claim 4, wherein when the display supports the SDR format, the second format converting circuit directly outputs the interface image that is not format converted to the blending circuit.

7. The circuit according to claim 4, wherein the second format converting circuit comprises:
an electro-optical transfer function (EOTF) circuit, converting the interface image having the SDR to an optic signal;
a color space converting circuit, performing color space conversion on the optic signal according to a target color space to generate a color converted optic signal;
an SDR-to-HDR converting circuit, converting the color converted optic signal to a converted optic signal having the HDR;
a color correcting circuit, adjusting a color of the format converted optic signal to generate a color adjusted optic signal; and
an optical-electro transfer function (OETF) circuit, converting the color adjusted optic signal to the format converted interface image.

8. The circuit according to claim 4, wherein the second format converting circuit comprises:
- an electro-optical transfer function (EOTF) circuit, converting the interface image having the SDR to an optic signal;
- a color space converting circuit, performing color space conversion on the optic signal according to a target color space to generate a color converted optic signal;
- an optical-electro transfer function (OETF) circuit, converting the color converted optic signal to the color converted electronic signal;
- an SDR-to-HDR converting circuit, converting the color converted electronic signal to a format converted electronic signal having the HDR; and
- a color correcting circuit, adjusting a color of the format converted electronic signal to generate the format converted interface image.

9. The circuit according to claim 4, wherein the playback device is a set-top box (STB), the display is a television, and the control circuit receives specification information from the television to determine whether the television supports the HDR format.

10. A circuit, applied to a playback device, comprising:
- an image format determining circuit, receiving an image signal, determining whether a format of the image signal is a standard dynamic range (SDR) or a high dynamic range (HDR) to generate a determination result;
- a control circuit, coupled to the image format determining circuit, generating a control signal according to the determination result;
- an image processing module, coupled to the image format determining circuit and the control circuit, selecting an image processing setting corresponding to one of the SDR format and the HDR format according to the control signal, and processing the image signal according to the image processing setting to generate a processed image signal, said image processing module comprising:
  - a format converting circuit, determining whether to perform format conversion on the image signal to generate a converted image signal according to the control signal, or directly outputting the image signal without performing format conversion on the image signal;
  - an image processing circuit, coupled to the first format converting circuit, processing the converted image signal or the image signal according to the image processing setting to generate an intermediate signal; and
  - a color space converting circuit, coupled to the image processing circuit, performing color space conversion on the intermediate signal according to the image processing setting to generate the processed image signal; and
- a blending circuit, coupled to the image processing module, superimposing an interface image onto the processed image signal to generate an output image signal to a display;

wherein said format converting circuit comprises:
- an electro-optical transfer function (EOTF) circuit, converting the image signal having the HDR to an optic signal;
- a color space converting circuit, performing color space conversion on the optic signal according to a target color space to generate a color converted optic signal;
- an optical-electro transfer function (OETF) circuit, converting the color converted optic signal to a color converted electronic signal;
- an HDR-to-SDR converting circuit, converting the color converted electronic signal to a format converted electronic signal having the SDR;
- a color correcting circuit, adjusting a color of the format converted electronic signal to generate the converted image signal.

11. A circuit, applied to a playback device, comprising:
- an image format determining circuit, receiving an image signal, determining whether a format of the image signal is a standard dynamic range (SDR) or a high dynamic range (HDR) to generate a determination result;
- a control circuit, coupled to the image format determining circuit, generating a control signal according to the determination result;
- an image processing module, coupled to the image format determining circuit and the control circuit, selecting an image processing setting corresponding to one of the SDR format and the HDR format according to the control signal, and processing the image signal according to the image processing setting to generate a processed image signal, said image processing module comprising:
  - a format converting circuit, determining whether to perform format conversion on the image signal to generate a converted image signal according to the control signal, or directly outputting the image signal without performing format conversion on the image signal;
  - an image processing circuit, coupled to the first format converting circuit, processing the converted image signal or the image signal according to the image processing setting to generate an intermediate signal; and
  - a color space converting circuit, coupled to the image processing circuit, performing color space conversion on the intermediate signal according to the image processing setting to generate the processed image signal; and
- a blending circuit, coupled to the image processing module, superimposing an interface image onto the processed image signal to generate an output image signal to a display;

wherein the image processing circuit is further coupled to a memory and stores data of the converted image signal or the image signal corresponding to a previous frame to the memory, for the image processing circuit to process the converted image signal or the image signal corresponding to a subsequent frame.

* * * * *